United States Patent [19]

Kodaira et al.

[11] 4,106,390
[45] Aug. 15, 1978

[54] PNEUMATIC LINEAR ACTUATOR

[75] Inventors: Hiroshi Kodaira; Mitsuo Masuda, both of Asahi, Japan

[73] Assignee: Kuroda Seiko Co., Ltd., Kawasaki, Japan

[21] Appl. No.: 744,592

[22] Filed: Nov. 24, 1976

[30] Foreign Application Priority Data

Dec. 1, 1975 [JP] Japan .................. 50-144101

[51] Int. Cl.² .......................... F15B 15/26
[52] U.S. Cl. ......................... 91/42; 91/43; 91/44; 91/359; 91/361; 91/399; 91/407; 91/450
[58] Field of Search ............... 91/35, 41, 42, 43, 44, 91/45, 1, 361, 450, 399, 407, 437, 359, 405, 363 R

[56] References Cited

U.S. PATENT DOCUMENTS

| | | | |
|---|---|---|---|
| 2,845,902 | 8/1958 | Anderson | 91/45 |
| 3,238,847 | 3/1966 | Moore | 91/43 |
| 3,361,034 | 1/1968 | Rothrock | 91/42 |
| 3,538,813 | 11/1970 | Cromeens | 91/1 |
| 3,608,431 | 9/1971 | Pease | 91/1 |
| 3,613,505 | 10/1971 | Bubula | 91/35 |
| 3,633,718 | 1/1972 | Wanner | 192/146 |
| 3,779,135 | 12/1973 | Sugimura | 91/45 |
| 3,896,985 | 7/1975 | Kiwalle | 228/2 |

OTHER PUBLICATIONS

"Programmierbarer Manipulator ...", (German Technical Brochure published in Apr. 1975).

Primary Examiner—Martin P. Schwadron
Assistant Examiner—Abraham Hershkovitz
Attorney, Agent, or Firm—Koda and Androlia

[57] ABSTRACT

A digitally controllable pneumatic linear actuator in which a moving piston driven by compressed air is initially decelerated by the pressure of compressed air applied to the both sides thereof in the course of its advancing movement toward a predetermined stop position and is then braked by a mechanical brake, thereby obviating failure of precise positioning of the piston due to the compressibility of air. The piston displacement is digitally detected, and the result of detection is fed back to a digital controller.

2 Claims, 3 Drawing Figures

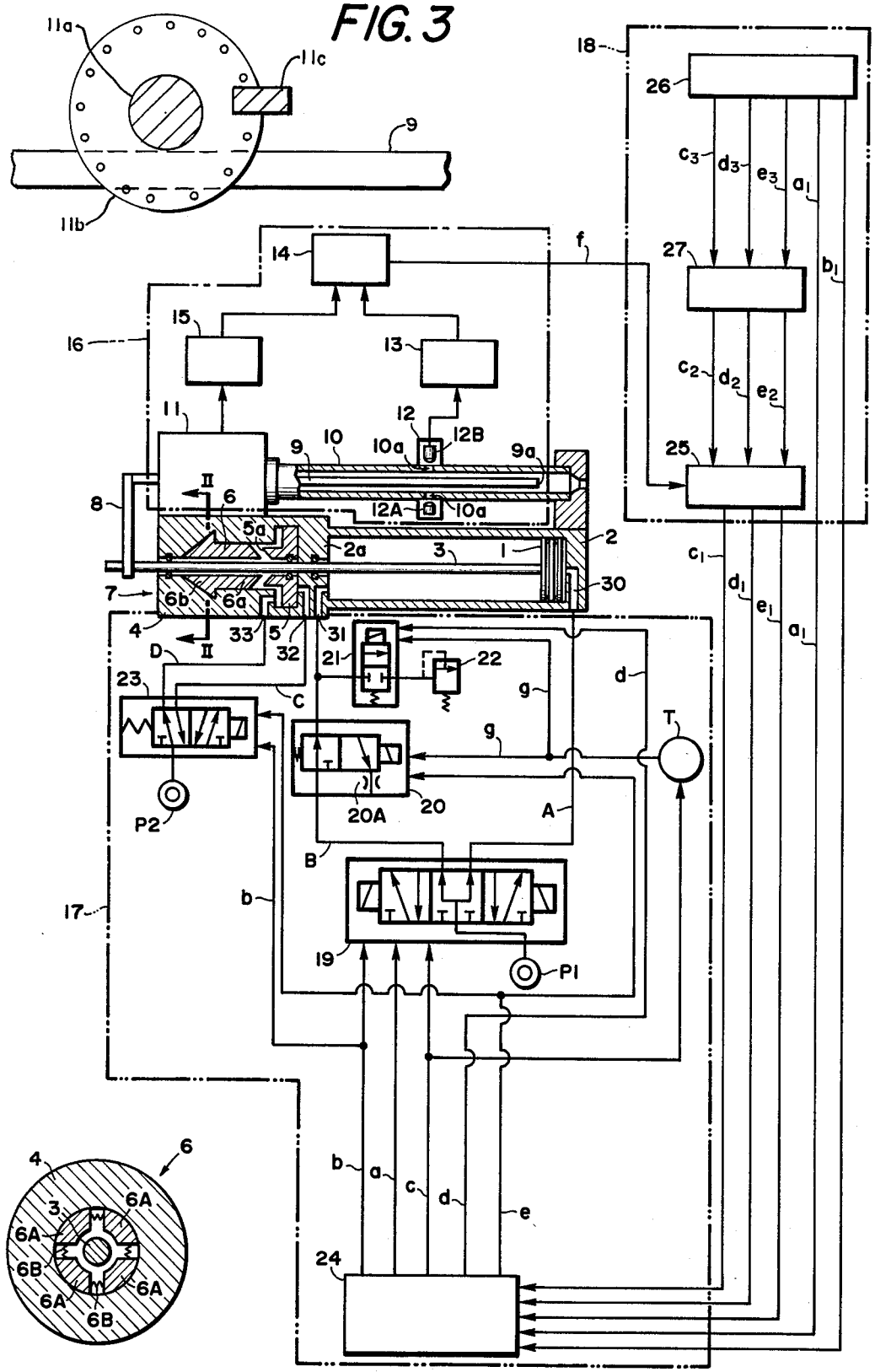

PNEUMATIC LINEAR ACTUATOR

BACKGROUND OF THE INVENTION

This invention relates to a pneumatic linear actuator, and more particularly to a digitally controllable pneumatic linear actuator.

Linear actuators, such as hydraulic cylinders, have hitherto been widely employed as driving units for feeding slides or tables of machine tools and linearly moving parts of other machines. However, such linear actuator has various demerits as follows:

(i) The actuator of this type cannot be directly controlled by a digital controller such as a computer.

(ii) The actuator of the above type cannot feed a moving part as precisely as a known actuator of another type comprising an electric motor and a feed screw does.

(iii) It is difficult for the linear actuator to precisely position a moving part without means such as a positive stopper, a dog or a limit switch disposed in the traveling path of the moving part.

While the actuator of the type above described has such demerits, it has various merits over the known actuator comprising the electric motor and the feed screw in that it can impart a quicker motion to a moving part and is less expensive and smaller in size than the latter type of actuator. It has therefore been strongly demanded to develop a linear actuator which can be directly controlled by a digital controller such as a computer and which eliminates the necessity for providing a stopper, a dog or like position detecting element in the traveling path of a moving part.

A hydraulic linear actuator satisfying the above demand has been recently developed and put into practical use. The linear actuator of this type can be directly controlled by a digital controller such as a computer and is provided with an electro-hydraulic servo valve. This known hydraulic linear actuator is, however, defective in that it cannot be used in an environment in which pollution with oil is strictly inhibited by the law or in an environment in which an inflammable fluid or substance exists or predominates. Further, due to the fact that the result of detection of displacement of the piston rod connected to the piston in the hydraulic linear actuator is directly fed back to the digital controller, this known hydraulic linear actuator has such another defect that detection errors tend to accumulate after a plurality of times of use resulting in degradation of the precision of positioning the piston.

It has therefore been strongly demanded to develop a pneumatic linear actuator which can be operated without the defects of the known hydraulic linear actuator. Generally, a pneumatically operated actuator such as an air cylinder or the like has such a basic defect that its piston rod cannot be precisely stopped at a predetermined stop position due to the compressibility of air which is the operating medium. A pneumatic linear actuator of hybrid type provided with a pneumato-hydraulic transducer has been proposed in an effort to obviate this defect of the pneumatic actuators. However, the linear actuator of the proposed type cannot also be used in an environment in which pollution with oil is inhibited by the law, like the hydraulic linear actuator.

An attempt is being made to mechanically brake the piston rod of a pneumatic actuators for the purpose of precisely stopping the piston at a predetermined stop position. In such a pneumatic actuators, mechanical wear of the piston rod is the problem which has to be solved.

SUMMARY OF THE INVENTION

A preferred embodiment of the pneumatic linear actuator according to the present invention comprises a piston driven by air under pressure, a mechanical brake mechanically braking a piston rod connected to the piston, and a control device controlling an operation sequence including decelerating the piston by applying air under pressure in the course of its advancing movement toward a predetermined stop position and then actuating the mechanical brake which acts to mechanically brake the piston rod.

In the pneumatic linear actuator of the present invention, the piston is initially decelerated by air under pressure in the course of its advancing movement toward the predetermined stop position and is then braked by the mechanical brake. It is therefore possible to obviate undesirable degradation of the precision of positioning due to the compressibility of air, to prevent mechanical wear of the piston rod and a mechanical brake engaging therewith, and to achieve the desired precise positioning of the piston.

The pneumatic linear actuator of the present invention provides generally the following features:

(a) The use of air under pressure as a sole operating medium permits operation of the linear actuator in an environment in which an inflammable fluid or substance exists or predominates.

(b) A signal representing the detected displacement of the piston is fed back to a main controller after proper correction. Therefore, accumulation of errors included in the signal can be avoided to eliminate lowering of the precision with lapse of time.

(c) A feedback loop is formed in the pneumatic linear actuator to eliminate the necessity for provision of a detector or the like on a machine tool or any other machine whose moving part is to be driven by the pneumatic linear actuator.

DETAILED DESCRIPTION OF THE INVENTION

It is a first object of the present invention to provide a pneumatic linear actuator in which air under pressure is employed as a sole operating medium and which is provided with a mechanical brake.

A second object of the present invention is to provide a novel pneumatic linear actuator which can be controlled by a digital controller.

A third object of the present invention is to provide an improved pneumatic linear actuator which can operate without accompanying mechanical wear on its piston rod and without lowering the precision of piston positioning with lapse of time.

BRIEF DESCRIPTION OF THE DRAWING

FIG. 1 is a diagrammatic view showing schematically the general structure of a preferred embodiment of the pneumatic linear actuator according to the present invention.

FIG. 2 is a partial sectional view taken along the line II—II in FIG. 1.

FIG. 3 is a simplified view of an analogue to digital converter.

DESCRIPTION OF THE PREFERRED EMBODIMENT

A preferred embodiment of the pneumatic linear actuator according to the present invention will be described in detail with reference to the accompanying drawing. FIG. 1 of the accompanying drawing shows schematically the general structure of the pneumatic linear actuator embodying the present invention.

Referring to FIG. 1, the numeral 1 designates a main piston received axially movably in a main cylinder 2. Securely fixed to this main piston 1 is one end of a piston rod 3 extending outward through one of the ends of the main cylinder 2. A braking cylinder 4 is disposed adjacent to the said end of the main cylinder 2 and is spaced from the main cylinder 2 by a partition wall 2a. A braking piston 5 having a central axial bore is received in this braking cylinder 4 so as to be axially movable relative to the piston rod 3 received in the main cylinder 2. A conical recess 5a is formed on one end surface of the braking piston 5 for engagement with a collet described below. A collet 6 is formed at one end thereof with a conical tail portion 6a disengageably engaged by the conical recess 5a of the braking piston 5 and is disposed in the braking cylinder 4 in axially aligned relation with the braking piston 5. This collet 6 engages with the mating inner wall portion of the braking cylinder 4 at a conical head portion 6b formed at the other end thereof and is normally maintained in an inoperative position in which it does not engage with the outer peripheral surface of the piston rod 3. The collet 6 is composed of a plurality of independent collet fingers 6A extending in axially parallel relation as, for example, shown in FIG. 2, and these collet fingers 6A are normally urged radially outward relative to the axis of the collet 6 by associated springs 6B interposed therebetween. The braking cylinder 4, braking piston 5 and collet 6 constitute a mechanical brake 7 for the piston rod 3. The piston rod 3 extends loosely through the central space of the braking cylinder 4, the central axial bore of the braking piston 5 and the central axial space of the collet 6 to protrude at the free end thereof externally beyond the corresponding end of the braking cylinder 4. A connecting arm 8 extending normal to the piston rod 3 is mechanically connected at one end thereof to the end of the piston rod 3 protruding externally from the braking cylinder 4 and at the other end thereof to one end of a rod 9 extending in parallel with the piston rod 3. The rod 9 is received in a sleeve 10 securely fixed to and disposed in parallel with the main cylinder 2 and is brought into actuating engagement with an AD converter 11 disposed adjacent to the braking cylinder 4. As shown in FIG. 3, the AD converter comprises a rotary wheel 11a making rotating engagement with the rod 9 to be rotated thereby, a disc coder 11b disposed in coaxial relation with the rotary wheel 11a to rotate therewith, and a photoelectric converter 11c converting rotating angle of the disc coder 11b into an electrical pulse signal, so that the axial displacement of the rod 9 in one direction (that is, the axial displacement of the rod 9 toward the left in FIG. 1) can be converted into an electrical pulse signal.

A pair of aligned apertures 10a of small diameter are bored in the wall of the sleeve 10 at right angles with respect to the axis of the sleeve 10, and a light source or projector 12A and a photosensitive element or light sensor 12B constituting a photoelectric detector 12 are fixedly mounted on the outer periphery of the sleeve 10 at the positions of the apertures 10a. This photoelectric detector 12 detects the movement of the rear end 9a of the rod 9 past the detecting position and is electrically connected to a reference pulse generator 13. This reference pulse generator 13 starts to generate a train of pulses by being triggered by the output of the photoelectric detector 12, and thus, the number of pulses generated by the reference pulse generator 13 represents the number of axial displacements of the rod 9. A wave shaping circuit 15 is electrically connected to the AD converter 11 for shaping the waveform of pulses generated by the AD converter 11 into a rectangular waveform. A digital comparator 14 is electrically connected to the reference pulse generator 13 and wave shaping circuit 15 to compare the output of the wave shaping circuit 15 with that of the reference pulse generator 13. The digital comparator 14 generates an output signal which is the same as that of the reference pulse generator 13 when the output of the wave shaping circuit 15 does not coincide with that of the reference pulse generator 13. The AD converter 11, photoelectric detector 12, wave shaping circuit 15, reference pulse generator 13 and digital comparator 14 constitute a displacement detector 16 which detects the axial displacement of the main piston 1 and its piston rod 3.

A controller 17 is provided for controlling the main piston 1 and its piston rod 3 and also for controlling the mechanical brake 7. This controller 17 comprises a solenoid-operated valve control unit 24, a five-port three-position solenoid-operated valve 19 of center supply type, three-port two-position solenoid-operated valve 20 with a discharge air flow restricting valve 20A, a two-port two-position solenoid-operated valve 21, a relief valve 22, a five-port two-position solenoid-operated valve 23, and a timer T. The solenoid-operated valves 19, 20, 21 and 23 are electrically connected to the solenoid-operate valve control unit 24, and the output of the timer T is electrically connected to the solenoid-operated valves 20 and 21. One of the two air pressure outlet ports of the five-port two-position solenoid-operated valve 19 is connected by a conduit A to a port 30 provided in the rear end of the main cylinder 2 for communication with one side of the main piston 1, while the other air pressure outlet port of this valve 19 is connected by a conduit B to another port 31 provided in the portion of the partition wall 2a defining the front end of the main cylinder 2 for communication with the other side of the main piston 1. This latter air pressure outlet port is also connected by the conduit B to the supply port of the two-port two-position solenoid-operated valve 20 having the discharge air flow restricting valve 20A. The outlet port of the two-port two-position solenoid-operated valve 21 is directly connected to the relief valve 22. One of the two air pressure outlet ports of the five-port two-position solenoid-operated valve 23 is connected by a conduit C to a port 32 provided in the portion of the partition wall 2a defining the rear end of the braking cylinder 4 for communication with one side of the braking piston 5, while the other air pressure outlet port of this valve 23 is connected by a conduit D to another port 33 provided in a suitable portion of the braking cylinder 4 for communication with the other side of the braking piston 5.

The solenoid-operated valve control unit 24 is also electrically connected to a main controller 18 which comprises a sequence signal generator 26, a piston displacement setting unit 27 and a coincidence circuit 25. The digital comparator 14 is electrically connected to the coincidence circuit 25 so that the comparator output representing the axial displacement of the main piston 1 can be fed back to the coincidence circuit 25. The sequence signal generator 26 generates a plurality of output signals which are sequentially applied to the solenoid-operated valve control unit 24 so as to control the operation of the individual solenoid-operated valves 19 to 23 according to a predetermined sequence. The sequence signal generator 26 acts, at the same time, to control the piston displacement setting unit 27 which determines the setting of axial displacement of the main piston 1. In other words, the piston displacement setting unit 27 provides a digital setting of axial displacement of the main piston 1 in response to the application of one of the predetermined input signals from the sequence signal generator 26.

The operation of the pneumatic linear actuator embodying one preferred form of the present invention will now be described in detail with reference to the drawing.

Before being placed in operation, the individual solenoid-operated valves 19 to 23, main piston 1 and braking piston 5 are in positions as illustrated in FIG. 1, and the collet 6 is in its released position. In response to the application of an advancing movement instruction signal $a_1$ to the solenoid-operated valve control unit 24 from the sequence signal generator 26, a corresponding advancing instruction signal $a$ is applied from the solenoid-operated valve control unit 24 to the five-port three-position solenoid-operated valve 19 of center supply type. As a result, the valve spool of this solenoid-operated valve 19 is urged leftward in FIG. 1, and air under pressure supplied from an air pressure source P1 flows into the right-hand space of the main cylinder 2 through the port 30 communicating with this space. At the same time, air existing in the left-hand space of the main cylinder 2 is discharged through the port 31 to the atmosphere through the three-port two-position solenoid-operated valve 20 and then through the five-port three-position solenoid-operated valve 19. Therefore, the main piston 1 is urged leftward in FIG. 1, and at the same time, the rod 9 mechanically connected to the piston rod 3 is also urged leftward in FIG. 1. A pulse signal representing the axial displacement of the rod 9 appears from the AD converter 11 to be applied to the digital comparator 14 after being shaped in waveform by the wave shaping circuit 15.

As soon as the rod end 9a of the rod 9 passes between the aligned apertures 10a of the sleeve 10, an output signal appears from the photoelectric detector 12 and is applied to the reference pulse generator 13 to trigger the same. Consequently, the output signal of the wave shaping circuit 15 and the output signal of the reference pulse generator 13 are simultaneously applied to the digital comparator 14. The digital comparator 14 compares these two input signals with each other and produces an output signal $f$. This output signal $f$ is the same as the output signal of the reference pulse generator 13 when the output signal of the wave shaping circuit 15 does not coincide with that of the reference pulse generator 13. This output signal $f$ of the digital comparator 14 is fed back to the coincidence circuit 25 in the main controller 18.

In response to the application of a displacement instruction signal $c_3$ from the sequence signal generator 26, the piston displacement setting unit 27 determines the moving stroke or axial displacement of the main piston 1 until it is initially decelerated after it starts to move in the advancing direction, and an output signal $c_2$ representing this piston displacement setting is applied from the piston displacement setting unit 27 to the coincidence circuit 25. When the number of pulses of the signal $f$ fed back from the displacement detector 16 to the main controller 18 coincides with that of the output signal $c_2$ of the piston displacement setting unit 27, a first deceleration instruction signal $c_1$ instructing the initial deceleration of the main piston 1 appears from the coincidence circuit 25 to be applied to the solenoid-operated valve control unit 24, and an instruction signal $c$ corresponding to the signal $c_1$ is applied from the solenoid-operated valve control unit 24 to the five-port three-position solenoid-operated valve 19 and to the timer T. Therefore, the timer T is actuated, and at the same time, the valve spool of the solenoid-operated valve 19 is restored to the original position illustrated in FIG. 1, with the result that air of the same pressure is applied from the air pressure source P1 to the opposite sides of the main piston 1 through the ports 30 and 31 of the main cylinder 2. Therefore, the velocity of the main piston 1 moving toward the left in FIG. 1 is abruptly reduced.

At the end of the timer operation, a second deceleration instruction signal $g$ is applied from the timer T to the three-port two-position solenoid-operated valve 20 and to the two-port two-position solenoid-operated valve 21, with the result that the valve spools of these solenoid-operated valves 20 and 21 are shifted toward the right-hand position and upper position respectively from the positions illustrated in FIG. 1. Consequently, the space on the left-hand side of the main piston 1 in the main cylinder 2 communicates with the relief valve 22 through the port 31 and two-port two-position solenoid-operated valve 21, and at the same time, with the discharge air flow restricting valve 20A connected with the discharge port of the three-port two-position solenoid-operated valve 20.

In the present invention, the flow restricting valve 20A is set to provide a greater resistance to the discharge air flow than the relief valve 22. Thus, in the above case, air under pressure existing in the left-hand space of the main cylinder 2 is gradually discharged to the atmosphere through the relief valve 22. In this manner, the amount of air under pressure discharged from the main cylinder 2 is controlled by the relief valve 22 which serves to maintain constant the difference between the pressures acting upon the opposite sides of the main piston 1, and the main piston 1 is gradually urged toward the left in FIG. 1 at a constant low velocity at which no stick slip will occur. In the course of the leftward movement of the main piston 1, the axial displacement of the main piston 1 is detected by the displacement detector 16. The axial displacement of the main piston 1 moving in such a reduced velocity is detected by the AD converter 11, and an electrical pulse signal representing the axial displacement of the main piston 1 appears from the AD converter 11 to be applied through the wave shaping circuit 15 and digital comparator 14 to the coincidence circuit 25 in the main controller 18 as the feedback signal $f$.

During the above manner of movement of the main piston 1, a reduced-velocity displacement instruction signal $d_3$ is applied from the sequence signal generator 26 to the piston displacement setting unit 27. In response to the application of this instruction signal $d_3$, the piston displacement setting unit 27 produces a corresponding instruction signal $d_2$ for determining the axial displacement of the main piston 1 moving at the reduced velocity. This signal $d2$ is applied to the coincidence circuit 25 to be compared with the signal $f$ fed back from the displacement detector 16.

When the axial displacement of the main piston 1 moving at the reduced velocity is the same as the setting represented by the output signal $d2$ of the piston displacement setting unit 27, that is, when the main piston 1 has moved at the low velocity by the distance set by the signal $d2$ after the appearance of the signal $c$, a third deceleration instruction signal $d1$ is applied from the coincidence circuit 25 to the solenoid-operated valve control unit 24. In response to the application of this instruction signal $d_1$, a corresponding signal $d$ appears from the solenoid-operated valve control unit 24 to shift the position of the valve spool of the two-port two-position solenoid-operated valve 21. As a result, the valve spool of the two-port two-position solenoid-operated valve 21 is restored to the position illustrated in FIG. 1, thereby interrupting the communication between the port 31 and the relief valve 22. Therefore, the relief valve 22 does not participate in the air discharge, and air under pressure in the left-hand space of the main cylinder 2 is now gradually discharged to the atmosphere from the discharge air flow restricting valve 20A connected to the discharge port of the three-port two-position solenoid-operated valve 20, and this rate of air discharge is dependent upon the opening of the flow restricting orifice of the valve 20A. Thus, the main piston 1 is gradually advanced toward the left in FIG. 1 at a very low velocity which is dependent upon the opening of the flow restricting orifice of the valve 20A. Prior to commencement of the advancing movement of the main piston 1 at such a very low velocity, a stop instruction signal $e3$ is applied from the sequence signal generator 26 to the piston displacement setting unit 27. In response to the application of this instruction signal $e3$, a signal $e2$ representing the setting of axial displacement of the main piston 1 moving at the very low velocity is applied from the piston displacement setting unit 27 to the coincidence circuit 25.

The axial displacement of the main piston 1 moving at the very low velocity is detected by the displacement detector 16, and an electrical pulse signal or digital signal is applied or fed back from the displacement detector 16 to the coincidence circuit 25. When the coincidence circuit 25 detects that the signal $f$ representing the detected piston displacement coincides with the signal $e_2$ representing the piston displacement setting, a stop instruction signal $e_1$ is applied from the coincidence circuit 25 to the solenoid-operated valve control unit 24, and a corresponding valve control signal $e$ is applied from the solenoid-operated valve control unit 24 to the solenoid-operated valves 20 and 23. The valve spool of the three-port two-position solenoid-operated valve 20 is restored to the original position illustrated in FIG. 1, with the result that air of the same pressure acts upon the opposite sides of the main piston 1 again, thereby imparting pneumatic brakes to the moving piston 1. At the same time, the valve spool of the five-port two-position solenoid-operated valve 23 is shifted to the right-hand position from the position illustrated in FIG. 1. Due to the shift of the valve spool of the solenoid-operated valve 23 to the above position, air under pressure supplied from another air pressure source $P_2$ acts now upon the right-hand side of the braking piston 5 in the braking cylinder 4 through the port 32 to cause quick movement of the braking piston 5 toward the left in FIG. 1. Consequently, the conical recess 5a formed on the front end of the braking piston 5 is brought into pressure engagement with the conical portion 6a of the collet 6 in the braking cylinder 4 to urge the collet 6 toward the left in FIG. 1. The collet 6 slides along the conical portion of the inner wall surface of the braking cylinder 4 until finally it is completely constricted. Therefore, the piston rod 3 is tightly clamped by the collet 6 to be mechanically braked and stopped. Thus, the piston rod 3 is completely brought to a halt, and the main piston 1 is precisely positioned at the predetermined stop position.

According to the present invention, the main piston 1 is initially decelerated by imparting pneumatic brakes at least one time and is then mechanically braked in a manner as described hereinbefore. The present invention is therefore advantageous in that the main piston can be reliably and precisely stopped at a predetermined stop position, and mechanical wear of the mechanical brake mechanism and piston rod can be substantially eliminated due to the reduced friction relative to each other.

The main piston 1 can be restored to the original position in a manner as described below after it is advanced to the predetermined stop position and stopped in that position.

In response to the application of a retracting movement instruction signal $b_1$ to the solenoid-operated valve control unit 24 from the sequence signal generator 26 in the main controller 18, a corresponding signal $b$ is applied from the solenoid-operated valve control unit 24 to the solenoid-operated valves 19 and 23. As a result, the valve spool of the solenoid-operated valve 23 is restored to the original position illustrated in FIG. 1 to permit discharge of air under pressure from the right-hand space of the braking cylinder 4 to the atmosphere through the valve 23. Air under pressure supplied from the air pressure source $P_2$ flows through the valve 23 into the left-hand space of the braking cylinder 4 to act upon the left-hand side of the braking piston 5. Consequently, the collet 6 is released from the pressure engagement with the braking piston 5, and the braking piston 5 is restored to the original position illustrated in FIG. 1. The valve spool of the solenoid-operated valve 19 is subsequently urged to the right-hand position from the position illustrated in FIG. 1, with the result that air under pressure in the space on the right-hand side of the main piston 1 in the main cylinder 2 is discharged to the atmosphere through the valve 19. Air under pressure supplied from the air pressure source $P_1$, in turn, flows through the valve 19 into the space on the left-hand side of the main piston 1 in the main cylinder 2 to urge the main piston 1 toward the right in FIG. 1 for restoring the same to the original position again.

The present invention described in detail hereinbefore is in no way limited to the specific illustrated embodiment, and various changes and modifications may be made therein. For example, the photoelectric detector 12 may be made freely movable along the axis of the sleeve 10, and a plurality of spaced pairs of apertures 10a may be provided along the sleeve 10, so that the main piston 1 can be moved over any desired stroke.

In the basic embodiment of the present invention described hereinbefore, the solenoid-operated valve control unit 24 may be adapted to carry out the sequential control without the provision of the main controller 18, and the main piston 1 may also be adapted to carry out the controlled sequential movement without the provision of the displacement detector 16. It should be noted, however, that the provision of the displacement detector 16 and main controller 18 is effective in achieving full automatic sequential control and ensuring precise operation of the pneumatic linear actuator of the present invention.

We claim:

1. A pneumatic linear actuator comprising a cylinder, a piston axially movable in said cylinder, a piston rod connected to said piston, mechanical braking means for mechanically engaging with said piston rod to mechanically brake said piston rod, displacement control means for automatically controlling sequential operation including pneumatically braking to decelerate said piston in the course of movement toward a predetermined stop position and then actuating said mechanical braking means to stop said piston and said piston rod at the predetermined stop position, a source of air pressure incorporated in said displacement control means to be connected to said cylinder and said mechanical braking means for supplying air under pressure to said cylinder and said mechanical braking means, a main control means of digital control type connected to said displacement control means for generating a sequence of control signals used to operate said displacement control means according to a predetermined sequence and detecting means for digitally detecting the axial displacement of said piston rod to feed back the digital signal representative of the detected axial displacement of said piston rod to said main control means of digital control type, said detecting means comprises:

a rod coupled to said piston;
    a sleeve covering said rod;
    an analogue to digital converter coupled to said rod such that said analogue to digital converter generates a pulse train as said rod moves together with said piston;
    a means for detecting when said rod has moved a predetermined distance inside of said sleeve;
    a reference pulse generator for generating a train of pulses in response to said rod position detector when said rod reaches said predetermined position; and
    a means for comparing said train of pulses from said analogue to digital converter with said train of pulses from said reference pulse generator.

2. A pneumatic linear actuator according to claim 1 wherein said analogue to digital converter comprises a rotary disc rotatably engaging with said rod and a photoelectric converter for converting the rotating angle of the disc into said pulse signal and said means for detecting when said rod has reached a predetermined position within said sleeve comprises a pair of holes provided opposite each other in said sleeve, a source of light shining into one of said holes and a photo-detector provided adjacent said other one of said pair of holes.

* * * * *